United States Patent [19]

Van Allen

[11] 4,317,625
[45] Mar. 2, 1982

[54] STROBE REFLECTOR ASSEMBLY

[75] Inventor: David Van Allen, Malden, Mass.

[73] Assignee: Polaroid Corporation, Cambridge, Mass.

[21] Appl. No.: 175,250

[22] Filed: Aug. 4, 1980

[51] Int. Cl.³ .............................................. G03B 15/02
[52] U.S. Cl. ........................................ 354/145; 362/16
[58] Field of Search ................. 354/126, 145; 355/67; 362/3, 16, 17, 18, 297, 347

[56] References Cited

U.S. PATENT DOCUMENTS

| | | | |
|---|---|---|---|
| 1,427,586 | 8/1922 | D'Olier | 362/319 X |
| 2,906,862 | 9/1959 | McCammon | 362/17 X |
| 3,167,256 | 1/1965 | Elliott | 362/17 |
| 3,167,258 | 1/1965 | Wilde | 362/220 |
| 3,237,003 | 2/1966 | Tomkinson | 362/16 |
| 3,484,597 | 12/1969 | Schmidt | 362/16 |
| 3,672,276 | 6/1972 | Erlichman | 352/78 X |
| 3,824,013 | 7/1974 | Kidd | 355/67 |
| 3,851,201 | 11/1974 | Orrvick et al. | 355/67 X |
| 3,967,302 | 6/1976 | Cote et al. | 354/295 |
| 3,997,778 | 12/1976 | Fieldstad et al. | 362/346 |
| 4,007,469 | 2/1977 | Land et al. | 354/128 X |
| 4,085,414 | 4/1978 | Burgarella et al. | 354/145 |
| 4,135,228 | 1/1979 | Lones | 362/18 |
| 4,150,422 | 4/1979 | Peralta et al. | 362/218 |
| 4,179,205 | 12/1979 | Finnemore et al. | 354/145 |
| 4,223,372 | 9/1980 | Takematsu | 354/145 X |

FOREIGN PATENT DOCUMENTS

| | | | |
|---|---|---|---|
| 988063 | 4/1976 | Canada | 362/17 |
| 2210948 | 9/1973 | Fed. Rep. of Germany | 362/16 |

*Primary Examiner*—Donald A. Griffin
*Attorney, Agent, or Firm*—Leslie J. Payne

[57] ABSTRACT

A reference surface is provided on the housing of a flash illumination apparatus for allowing accurate positioning of a flash tube relative to a predetermined length of a flash reflector. This reference surface is spaced from the adjacent end of the predetermined reflector length so that positioning of one tube end and the reference surface against an appropriate aligning surface accurately centers the tube relative to the reflecting surface. Moreover, either the housing or a reflector main body has structure for cooperating with separate end members of a multi-component reflector for preventing the end members from being assembled so that the reflecting surfaces thereof do not face each other.

13 Claims, 5 Drawing Figures

STROBE REFLECTOR ASSEMBLY

BACKGROUND OF THE INVENTION

This particular invention is directed generally to lighting fixtures and, more particularly, to electronic strobe units for photographic purposes.

Use of electronic strobe units primarily for photographic apparatus is well known. Typically, such strobe units comprise a housing assembly including a parabolic reflector and an electrically energizable flash tube generally surrounded by the reflector. Examples of strobe units and related lighting fixtures are exemplified by the following patents issued to: Elliot, U.S. Pat. No. 3,167,256; Wilde, U.S. Pat. No. 3,167,258; Lones, U.S. Pat. No. 4,135,228; Andra, Canadian Pat. No. 988,063; and to Schmidt, U.S. Pat. No. 3,484,597. One known unit has been manufactured by the Rollei Manufacturing Company of West Germany. This electronic strobe includes a multi-component reflector in a housing with a gas discharge tube projecting through and beyond openings in opposite ends of the reflector and housing. A pair of resilient members secure projecting tube ends to protruding housing ears.

To insure quality photographs when using strobes of the above type, it will be appreciated its output values and light distribution pattern be repeatably consistent with the values and pattern they were calibrated for. Otherwise, the strobes would not perform in the manner intended. Correspondingly, the quality of the resultant photographs would, of course, suffer. Therefore, it is critical for good photographic results to have the strobe perform in the manner intended.

Towards this end, it is highly critical that the flash tube be relatively precisely located relative to the reflector and, in turn, of course, the reflector be relatively precisely located in the housing. It has been determined that if the flash tube is misaligned by as little as a few thousands of an inch, the resulting light distribution pattern will be skewed. As a result, the strobe does not provide the uniform reflectivity desired for insuring uniform brightness characteristics of the photograph. Likewise, reflector misalignments cause similar problems. Moreover, the problems of avoiding inaccurate placement of the flash tube and reflector components are, as noted above, further compounded by the requirement that these difficult to center components as well as the associated housing be of a construction which facilitates manual mass production assembly in an easy, accurate and economical manner. For instance, the noted Rollei strobe unit was determined to have significant drawbacks because of misalignment potential. In this regard, the reflector suffered from the shortcoming of floating (i.e., it was angularly shiftable relative to a preselected position within the housing). Also, a likelihood existed that the separate end reflecting pieces of the multi-component reflector might be installed with their reflecting surfaces not facing each other. Moreover, the flash tube was spaced from the reflector by grommets. Because of this spacing there was a tendency for dust particles to become carburized during flash triggering as a result of the potential existing between the tube and the reflector. These foregoing factors coupled with the absence of means for positively ensuring correct longitudinal positioning of the tube relative to the reflector resulted in a strobe construction having a relatively high probability of component misalignment and was less than entirely successful. As a result, intended light distribution values and patterns were difficult to attain.

SUMMARY OF THE INVENTION

In accordance with the present invention, the noted problems and potential for problems associated with the construction and assembly of known strobe units are overcome or substantially minimized. This is brought about by the provision of improved artificial illumination apparatus for use in conjunction with photographic apparatus.

Such illumination apparatus includes a housing assembly having a pair of opposed wall sections defining an open-ended cavity. Included in the housing assembly is a light reflective surface located interiorly so as to reflect light through the open end. The light reflective surface has a predetermined length along an axis generally parallel to the open end of the cavity. Included is an artificial illumination tube energizable for providing artificial illumination and extending through openings in opposed wall sections of the assembly including the light reflecting surface. The tube has a preselected portion longitudinally positioned within the cavity and relative to the predetermined length of the reflecting surface to facilitate optimum light distribution. These openings are constructed to facilitate attachment of electrical leads to the tube.

In an illustrated embodiment, there is provided means for defining a reference surface on the exterior of at least one of the housing end walls for allowing accurate positioning of the tube portion of preselected length relative to the predetermined length of the reflecting surface so as to facilitate optimum light distribution. The reference surface is spaced a predetermined distance from the adjacent end of the predetermined reflector length such that positioning of one end of the tube with respect to the reference surface accurately centers the preselected tube length in the reflecting surface.

In another embodiment, either the housing or the reflector has means for cooperating with end members of the reflector in a manner to prevent the reflecting surfaces of these members from not facing each other.

In another embodiment, the reflector includes a main light reflecting body having means for mating with the housing for insuring proper alignment of the main reflecting body in the cavity.

Among the objects of the invention are, therefore, the provision of an improved flash apparatus for use with photographic apparatus; the provision of an improved flash apparatus which is easily assembled and reliably provides for the desired flash output; the provision of a flash apparatus which enables accurate positioning of a flash tube and reflector; and the provision of a flash apparatus which insures against reflector components being assembled in a reverse manner.

Other objects and further scope of applicability of the present invention will become apparent from the reading of the detailed description to follow when taken in conjunction with the accompanying drawings in which like parts are designated by like reference numerals.

DETAILED DESCRIPTION

Figure 1:
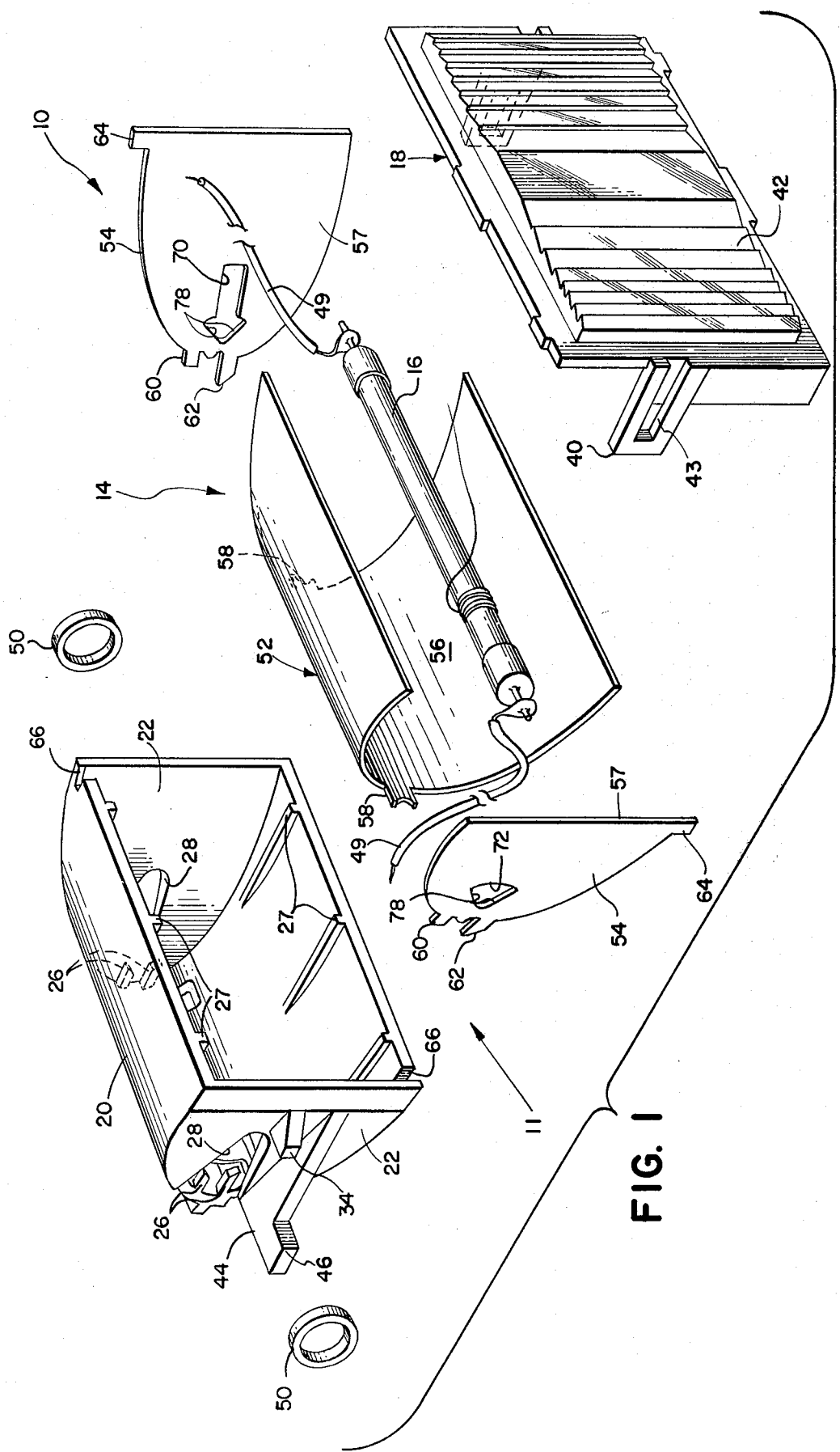
FIG. 1 is an exploded perspective view depicting the elements forming the strobe unit of this invention.

As shown in FIG. 1, the strobe reflector apparatus 10 of the present invention is seen to essentially include a housing assembly 11 including a housing 12, a reflecting device 14, an energizable artificial illuminating tube 16 of the gas discharge type and a lens 18.

Figure 2:
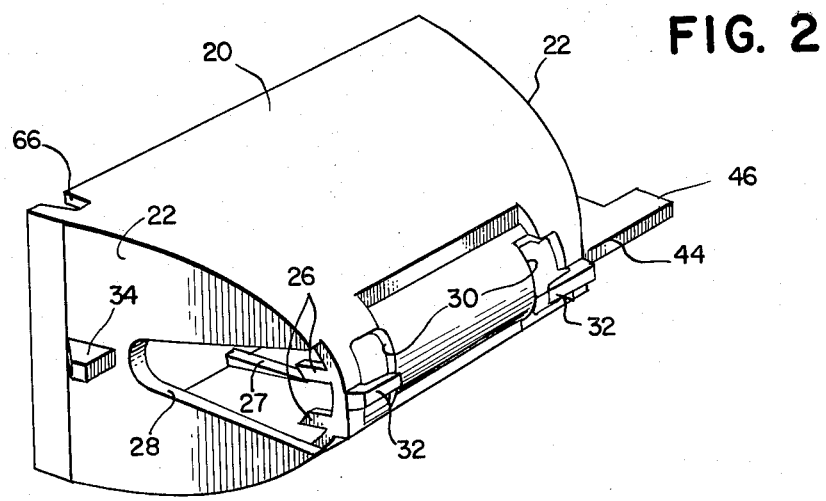
FIG. 2 is a rear perspective view showing greater detail of the strobe unit housing.
Figure 3:
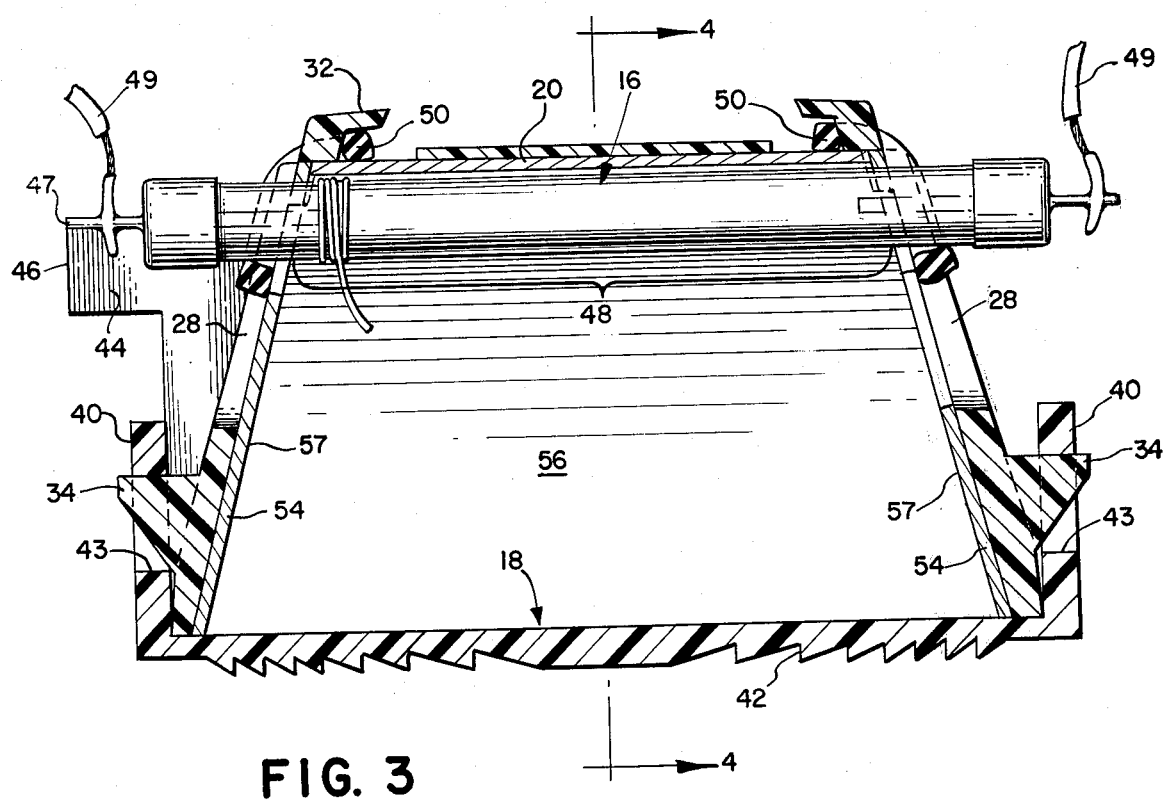
FIG. 3 is a cross-sectional view of the strobe unit.
Figure 4:
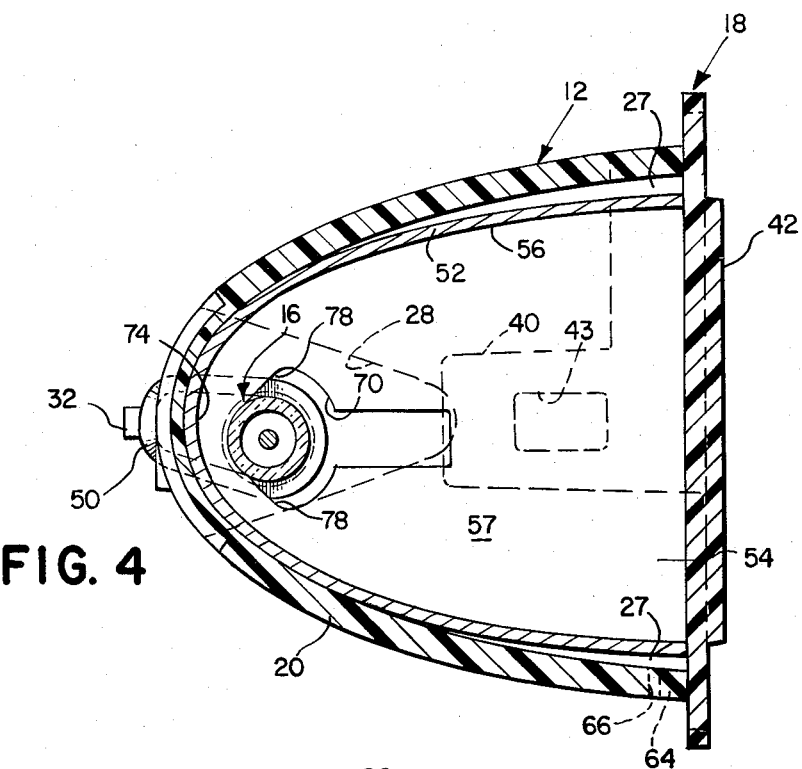
FIG. 4 is a cross-sectional view taken substantially along the section line 4—4 appearing in FIG. 3.

Referring now to FIGS. 1-4, it will be noted that the housing 12 includes a main wall section 20 and a pair of opposed end walls 22. As shown in FIG. 4, the main wall 20 has, in cross-section, a generally parabolic shape and is made of a suitable plastic material. The housing 12 defines an open-ended cavity 24 which is dimensioned and configured to receive the reflecting device 14.

As shown in FIG. 1, adjacent each opposite longitudinal interior end of the main wall 20 is a projecting pair of spaced apart relatively rigid fingers 26 having chamfered lead in surfaces. Adjacent the open end of cavity 24 is a plurality of longitudinally spaced compressing ribs 27 formed interiorly and on opposite longitudinal sides of the main wall 20. Formed in the end walls 22 is a generally triangular-shaped side wall opening 28. These openings 28 are dimensioned and aligned to facilitate passage of the tube 16 therethrough, but do not contact the tube 16. The significance of this will be described presently.

As best shown in FIG. 2, a pair of longitudinally opposed openings 30 are formed adjacent the apex of the parabolic main wall 20. Extending outwardly from opposite ends of the main wall 20 and adjacent the apex thereof is a pair of generally L-shaped retaining members 32. Protruding exteriorly from each of the side walls 22 is a latching member 34; one of which is shown. These latching members 34 are constructed to facilitate a snap-fit cooperation with the lens 18.

Figure 5:
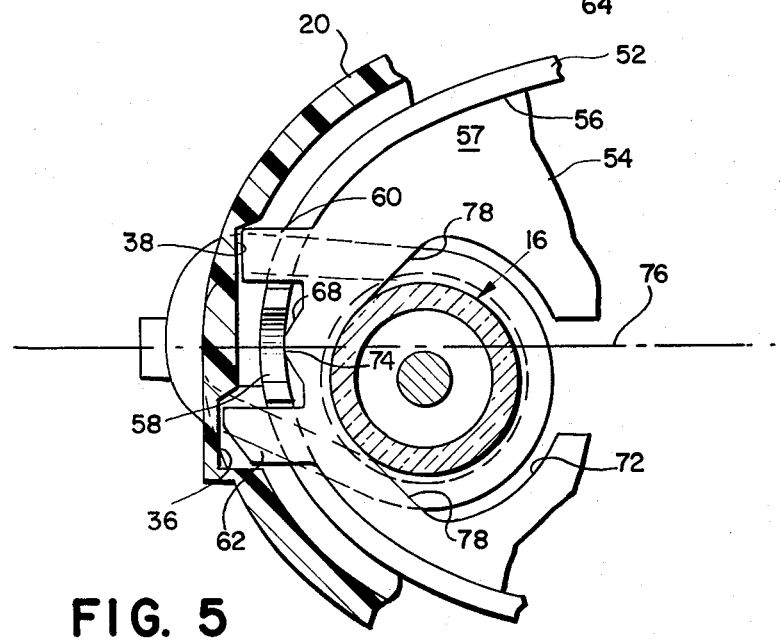
FIG. 5 is an enlarged fragmentary view showing greater detail of the cooperation between components of the strobe unit.

Referring now to FIG. 5, it will be observed that the interior of the main wall 20 is provided with a deep recess 36 and a shallow recess 38. The significance of having the recesses 36 and 38 of different dimensions will be explained subsequently.

Referring now to the flash lens 18, it is seen as including a pair of opposed latching fingers 40 extending rearwardly of the lenticulated front face 42. The front face 42 is configured to direct the light generated by the flash tube 16 towards the scene to be photographed. The lens 18 is made of a suitable material for this purpose as well as to facilitate its snap-on assembly to the housing 12. In this latter regard, each of the latching fingers 40 has as opening 43. The openings 43 are constructed and dimensioned to have a snap-fit cooperation with a corresponding one of the latching members 34 in a manner enabling a lens surface to directly engage the forward edge of the housing 12, such as shown in FIG. 4. This arrangement facilitates proper spacing of the tube 16 relative to the lens 18.

Critical to obtaining the desired reflected light output of the strobe reflector apparatus 10 is the accurate positioning of the tube 16 and the reflecting device 14. Towards the end of accurately longitudinally positioning the tube 16, a generally L-shaped gauge 44 is provided. In this embodiment, it projects outwardly from one of the side walls 22. The terminating end of the gauge 44 defines a generally planar reference surface 46. Significantly, the reference surface 46 is at a predetermined distance from the adjacent end of the reflector length. This distance is regulated so that a preselected portion of the light generating portion 48 (FIG. 3) of the tube 16 is accurately positioned vis-a-vis an operative predetermined length of the reflecting element 52 of the reflecting device 14 to insure the maximum desired reflective output. This predetermined length of the reflecting device 14 is best shown in FIG. 3 as that distance between the separate end members 54 of the reflecting device 14. Positioning of the tube 16 can be achieved by forcing a free end 47 of the tube and the reference surface 46 against a planar aligning surface (not shown). This insures that the free end 47 of the tube 16 is in a common imaginary plane with the reference surface 46. Thus, the gauge 44 provides means defining a reference surface for allowing accurate positioning of the preselected tube portion length 48 relative to the predetermined length of the reflecting device 14 to facilitate optimum light distribution. It will be understood, of course, that although in this embodiment the tube 16 is aligned by having one of its free ends 47 being placed in a common imaginary plane with the reference surface 46 other configurations and spacings for the reference surface are contemplated as well as other positions of the tube, vis-a-vis the reference surface 46 so long as the tube will be correctly positioned relative to the reflecting device to give maximum reflective output when the tube end 47 and the reference surface contact an aligning surface.

In this embodiment, the gauge 44 is relatively narrow and spaced from projecting ends of the tube 16 by a distance sufficient for facilitating soldering of the wires 49 to opposite projecting terminals of the tube. Also, the foregoing space facilitates installation of resilient bands 50 over ends of the tube 16 and the retaining members 32. It will also be appreciated that a second gauge similar in construction and function to the gauge 44 can be provided to extend from the same housing side 22 so as to be located on the opposite side of opening 28, thereby assuming a generally parallel and spaced apart relationship with the gauge 44. This is for protecting against tube breakage.

Now with reference to the reflecting device 14, it is seen to include a main reflector element 52 having a parabolic shape and a pair of opposed generally flat reflecting end members 54. The reflector element 52 is made of a suitable flexible metal provided with a highly polished concave reflecting surface 56, while the reflecting end members 54 are provided with a polished light reflecting surface 57. Formed at opposite longitudinal ends of the main reflector element 52 is an end stub 58 constructed to fit between the fingers 26. As a result of this, the reflector element 52 can be easily and positively connected to the housing 12 in an accurately centered position so as to facilitate desired reflection. Moreover, the compressing ribs 27 serve to compress outer edges of the resilient reflector element 52 inwardly when the latter is inserted into the housing 12 to aid in retaining the reflector element in the assembled position.

As best depicted in FIG. 4, the reflecting end members 54 are constructed to have a general parabolic configuration; matching that of the side walls 22 and the general parabolic curve of the reflector element 52. A pair of positioning legs 60, 62 is formed adjacent the apex of each of the reflecting end members 54. As shown in FIG. 5, these legs straddle the end stub 58.

As shown best in FIG. 5, the shorter leg 60 cooperates with the shallow recess 38, while the longer leg 62 cooperates with the deep recess 36. The leg 62 is dimensioned relative to the shorter leg 60 so that should the leg 62 contact the shallow recess 38 during assembly, an operator cannot properly insert the end member 54 into the housing 12. This is because a top edge of the end member 54 would stick above the exposed edge of the wall 22. Such a projection signifies that the reflecting surface 57 does not face inwardly as it should.

Accordingly, the foregoing provides means for inhibiting an operator from having the position of the end member 54 reversed from its intended position so that the reflecting surface 57 faces in the wrong direction. Moreover, the legs 60, 62 straddle the stub 58 for preventing slight rotation of the end members 54 once placed in the housing 12.

A generally flat aligning tab 64 extends laterally from the marginal edge of each of the end members 54. In the assembled condition, the aligning tabs 64 cooperate with complementary shaped notches 66 formed in diagonally opposed edges of the housing 12. Such arrangement, as with the foregoing arrangement of legs 60, 62 and recesses 36, 38, serves as anti-reversing means for inhibiting or preventing an operator from putting the end members 54 into the housing 12 in a reverse position, whereby the reflecting surfaces 57 would not face each other. This invention envisions that the tabs 64 could indeed cooperate with notches formed in the main reflector element 52, if necessary.

For controlling the artificial illumination, it is important to achieve the correct positioning of the tube 16 relative to the reflecting surface 56. In this embodiment, the tube 16 has to be properly positioned relative to the apex 74 of the reflecting surface 56 and the tube 16 has to be correctly offset below the centerline 76 (FIG. 5) of the reflecting surface 56. A dimple 68 is formed intermediate the legs 60 and 62 and directly engages the stub 58. This direct engagement facilitates making sure that the end members 54 are in direct contact with the reflector element 52 so as to enhance correct positioning. Also, the members 54 have their openings 70, 72 appropriately constructed to be appropriately off-center relative to the longitudinal centerline of the end members 54. Adjacent the apex of the end members 54 are V-notched edges 78 formed to define portions of the openings 70, 72 and converge toward the legs 60, 62. These edges 78 serve to uniformly transversely space or gap the tube 16 relative to the apex 74. Moreover, the tube 16 directly contacts the end members 54. This eliminates the potential difference between the tube and the reflector. Accordingly, the carburization of dust particles problem is overcome. As noted, the openings 70 and 72 are offset below the centerline of the reflecting end members 54. As a consequence, the tube 16 is correspondingly offset relative to the centerline 76. Thus, appearance of, for example, black bands at the top of photographs is eliminated, thereby assuring greater brightness uniformity in the resulting photographs. The significance of this offset is more fully described and also claimed in copending application Ser. No. 175,060, entitled "Photographic Strobe Apparatus" by William T. Plummer, contemporaneously filed herewith and being in common assignment herewith.

Again referring to FIGS. 3 and 4, the pair of elastomeric bands 50 is used for releasably securing projecting opposite end portions of the tube 16 to the retaining members 32. The resilient force provided by the bands 50 effects a snug engagement of the tube 16 to the V-notch edges 78 formed in the reflecting end members. Thus, the elastomeric bands 50 provide a very convenient and reliable means for securing opposite tube ends of the housing 12. Moreover, the elastomeric rings facilitate quick disassembly of the tube 16.

From the foregoing detailed description of the strobe reflector housing 10, it is believed that its operation and assembly are apparent.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. A flash illumination apparatus for photographic apparatus comprising:
    a housing assembly defining an open-ended cavity and including a pair of opposed end wall sections spaced apart along a given axis generally parallel to the open end;
    said housing assembly including a light reflective surface located interiorly thereof so as to reflect light through the open end of said cavity, said light reflective surface having a predetermined length along said given axis;
    an opening formed in each of said opposed wall sections and extending through said light reflecting surface to permit passage therethrough of an illumination tube;
    an energizable illumination tube having a portion of preselected length and being movable for longitudinal centering thereof relative to said predetermined reflector length to facilitate optimum light distribution by the light reflecting surface, said tube having opposite end portions of given lengths projecting from said openings to permit attachment of electrical leads thereto;
    means for defining a reference surface on the exterior of at least one of said housing end wall sections for allowing accurate positioning of said preselected tube length relative to said predetermined reflector length to facilitate optimum light distribution, said reference surface being spaced a predetermined distance from the adjacent end of said predetermined reflector length such that when one end portion of said tube and said one housing end wall section generally simultaneously engage a contact means said reference surface allows said preselected tube length to be accurately centered in said reflecting surface; and
    means for securing said tube to said housing assembly.

2. The apparatus of claim 1 wherein said reference surface is spaced relative to said adjacent end of said reflector length such that when said tube is centered said reference surface and said one end of said tube are coplanar.

3. The apparatus of claim 1 wherein said reference surface and said tube are constructed and arranged to engage said contact means which includes an aligning surface.

4. Flash illumination apparatus comprising:
    a housing defining a cavity with an open face and having a pair of opposed end wall sections spaced apart along an axis generally parallel to the plane of said open face;

a light reflecting device comprising a reflective body and a pair of reflective end members located in said cavity to reflect light through the open face thereof, each of said members having one reflective face, said members being interposed between the respective ends of said reflective body and the wall sections adjacent thereto with the light reflecting surface of each member facing the other member so as to facilitate reflection of the artificial illumination provided by said tube towards the open face;

said housing or said reflective body having means for inhibiting the assembly of said end members in a reverse manner, wherein the reflecting surfaces thereof do not face each other;

an energizable illumination tube positioned within said light reflective device; and each of said end members having means for cooperating with said inhibiting means to prevent said end members from being assembled so that the reflective surfaces do not face each other, wherein each of said means cooperating with said inhibiting means includes an integral portion projecting from one side of said end member, said inhibiting means includes a notch formed in each of a second pair of opposite wall sections of said housing, said notches being generally diagonally opposite the other and constructed to retain said projecting portions, said projecting portions being arranged, so that when in the assembled condition, each faces in an opposite direction to the other and cooperates with a corresponding one of said diagonally opposed notches.

5. The apparatus of claim 4 further comprising:

means for defining a reference surface on the exterior of at least one of said housing end wall sections for allowing accurate positioning of a preselected tube length relative to a predetermined reflector body length to facilitate optimum light distribution, said reference surface being spaced a predetermined distance from the adjacent end of said predetermined reflector body length such that positioning of one end of said tube with respect to said reference surface accurately centers said preselected tube length to said reflecting surface; and means for securing said tube to said housing assembly.

6. The apparatus of claim 5 wherein said reference surface and free end of said tube are constructed to engage against an aligning surface configured to insure that said preselected tube length is accurately positioned relative to a predetermined reflector body.

7. The apparatus of claim 6 wherein said reference surface is spaced relative to said adjacent end of said reflector body length such that when said tube is centered said reference surface and said one end of said tube are coplanar.

8. Apparatus for artificial illumination comprising:

a housing defining a cavity with an open end and including means for mating with a light reflecting device, said housing having a pair of opposed wall sections;

an artificial illumination tube energizable for providing a source of artificial illumination;

a light reflecting device having an element with a light reflecting surface constructed to reflect light through the open end, said element having means for mating with said housing mating means to retain said element within the cavity in a predetermined centered position to avoid undesired movement of said element;

said reflecting device including a pair of opposed end members, each one of said end members adjacent corresponding opposite ends of said reflecting element and said opposed wall sections, each one of said end members having a light reflecting surface facing the other to facilitate reflection of the artificial illumination provided by said tube towards the open end;

one of said housing or said element having means for inhibiting the assembly of said end members in a reverse manner, wherein the reflecting surfaces of said end members would not face each other;

each of said end members having means for cooperating with said inhibiting means to prevent the end members from being assembled so that the reflecting surfaces thereof do not face each other;

each of said end members and opposing sections of said housing having an opening, said openings being generally aligned with respect to each other and constructed and dimensioned to facilitate accurate longitudinal and transverse positioning of said tube with respect to said reflecting surface as well as facilitate retention of said tube in said housing;

means for connecting said tube to said housing;

said light reflective surface of said element has a predetermined length;

said tube having a portion of preselected length longitudinally positioned relative to the predetermined length of said light reflecting surface to facilitate optimum light distribution of the artificial illumination provided by said light reflecting surface;

said tube having opposite end portions projecting from said openings to permit attachment of electrical leads thereto; and means extending a predetermined distance from the exterior of said housing for allowing accurate positioning of said tube portion of preselected length relative to the predetermined length of said reflecting surface so as to facilitate optimum light distribution, said extending means permitting a free end of said tube and a reference surface thereof to simultaneously contact a surface configured to insure that said free end is at such a distance from the exterior wall as to insure accurate positioning of said tube portion of preselected length relative to the predetermined length of said reflecting surface.

9. The apparatus of claim 8 wherein each of said means cooperating with said inhibiting means includes an integral portion projecting from one side of said end member, said inhibiting means includes a notch formed in each of a second pair of opposite wall sections of said housing, said notches being generally diagonally opposite the other and constructed to retain said projecting portions, said projecting portions being arranged, so that when in the assembled condition, each faces in an opposite direction to the other and cooperates with a corresponding one of said diagonally opposed notches.

10. The apparatus of claim 9 wherein said means cooperating with said inhibiting means further includes a pair of legs with one leg shorter than the other, said inhibiting means further includes a pair of recesses formed in said housing with one shallower than the other, wherein said shallower recess cooperates with said shorter leg and said other longer leg cooperates with said other deeper recess to insure that said reflecting surfaces of said end members face each other when assembled, and said longer leg being constructed not to cooperate with said shallower recess to insure that said end members are not assembled in a reverse manner, whereby the reflecting surfaces thereof face away from each other.

11. The apparatus of claim 8 wherein said connecting means includes a pair of opposed retaining members, each one of which is adjacent a corresponding one of said tube end portions, and a pair of resilient members, each being constructed to fit about corresponding ones of said tube end portion and said retaining member so as to retain said tube to said housing assembly.

12. Apparatus for artificial illumination comprising:
a housing defining a cavity with an open end and including means for mating with a light reflecting device, said housing having a pair of opposed wall sections;
an artificial illumination tube energizable for providing a source of artificial illumination;
a light reflecting device having an element with a light reflecting surface constructed to reflect light through the open end, said element having means for mating with said housing mating means to retain said element within the cavity in a predetermined centered position to avoid undesired movement of said element;
said reflecting device including a pair of opposed end members, each one of said end members adjacent corresponding opposite ends of said reflecting element and said opposed wall sections, each one of said end members having a light reflecting surface facing the other to facilitate reflection of the artificial illumination provided by said tube towards the open end;
one of said housing or said element having means for inhibiting the assembly of said end members in a reverse manner, wherein the reflecting surfaces of said end members would not face each other;
each of said end members having means for cooperating with said inhibiting means to prevent the end members from being assembled so that the reflecting surfaces thereof do not face each other;
each of said end members and opposing sections of said housing having an opening, said openings being generally aligned with respect to each other and constructed and dimensioned to facilitate accurate longitudinal and transverse positioning of said tube with respect to said reflecting surface as well as facilitate retention of said tube in said housing;
means for connecting said tube to said housing; and
each of said means cooperating with said inhibiting means includes an integral portion projecting from one side of said end member, said inhibiting means includes a notch formed in each of a second pair of opposite wall sections of said housing, said notches being generally diagonally opposite the other and constructed to retain said projecting portions, said projecting portions being arranged, so that when in the assembled condition, each faces in an opposite direction to the other and cooperates with a corresponding one of said diagonally opposed notches.

13. Apparatus for artificial illumination comprising:
a housing defining a cavity with an open end and including means for mating with a light reflecting device, said housing having a pair of opposed wall sections;
an artificial illumination tube energizable for providing a source of artificial illumination;
a light reflecting device having an element with a light reflecting surface constructed to reflect light through the open end, said element having means for mating with said housing mating means to retain said element within the cavity in a predetermined centered position to avoid undesired movement of said element;
said reflecting device including a pair of opposed end members, each one of said end members adjacent corresponding opposite ends of said reflecting element and said opposed wall sections, each one of said end members having a light reflecting surface facing the other to facilitate reflection of the artificial illumination provided by said tube towards the open end;
one of said housing or said element having means for inhibiting the assembly of said end members in a reverse manner, wherein the reflecting surfaces of said end members would not face each other;
each of said end members having means for cooperating with said inhibiting means to prevent the end members from being assembled so that the reflecting surfaces thereof do not face each other;
each of said end members and opposing sections of said housing having an opening, said openings being generally aligned with respect to each other and constructed and dimensioned to facilitate accurate longitudinal and transverse positioning of said tube with respect to said reflecting surface as well as facilitate retention of said tube in said housing;
means for connecting said tube to said housing; and
said means cooperating with said inhibiting means includes a pair of legs with one leg shorter than the other, said inhibiting means further includes a pair of recesses formed in said housing with one shallower than the other, wherein said shallower recess cooperates with said shorter leg and said other longer leg cooperates with said other deeper recess to insure that said reflecting surfaces of said end members face each other when assembled, and said longer leg being constructed not to cooperate with said shallower recess to insure that said end members are not assembled in a reverse manner, whereby the reflecting surfaces thereof face away from each other.

* * * * *